United States Patent [19]

Walraven

[11] 4,185,795
[45] Jan. 29, 1980

[54] MAGNETIC TAPE DRIVE WITH FRICTION COMPENSATION

[75] Inventor: Anthonie Walraven, Eindhoven, Netherlands

[73] Assignee: U.S. Philips Corporation, New York, N.Y.

[21] Appl. No.: 934,826

[22] Filed: Aug. 18, 1978

[30] Foreign Application Priority Data

Sep. 16, 1977 [NL] Netherlands .......................... 7710163

[51] Int. Cl.² ...................... G11B 15/26; G11B 15/60; B65H 57/14
[52] U.S. Cl. .................................... 242/209; 226/181; 226/196; 242/76
[58] Field of Search .......... 242/76, 200, 201, 204–210; 360/71–73; 226/88, 168, 181–183, 196

[56] References Cited

U.S. PATENT DOCUMENTS

| | | | |
|---|---|---|---|
| 2,687,882 | 8/1954 | Pettus | 242/209 |
| 2,893,653 | 7/1959 | Schultheis et al. | 242/209 |
| 2,948,488 | 8/1960 | Schoebel et al. | 242/75.43 |
| 3,820,701 | 6/1974 | Clunis | 226/183 |
| 4,091,979 | 5/1978 | Browder | 226/196 |

*Primary Examiner*—Stanley N. Gilreath
*Attorney, Agent, or Firm*—David R. Treacy

[57] ABSTRACT

In a magnetic tape drive arrangement having a tension-controlled loop, with the tension in the part of the magnetic tape upstream from the loop being maintained constant as far as possible by suitable means in a conventional manner, compensation of variations of the tension of the magnetic tape in the loop as the result of variations in the coefficients of friction of the magnetic heads due to changes in temperature and humidity, is provided by an element which frictionally engages the magnetic tape upstream from the closed loop, coefficient of friction and angle of contact of the element being selected in accordance with a specific relationship.

7 Claims, 2 Drawing Figures

MAGNETIC TAPE DRIVE WITH FRICTION COMPENSATION

BACKGROUND OF THE INVENTION

The invention relates to a magnetic tape drive for a recording or playback apparatus housing; a capstan for driving the magnetic tape with an accurately defined speed; a tape guide member around which the magnetic tape coming from the capstan is passed under tension; a plurality of magnetic heads for cooperation with the magnetic tape; and a control device for maintaining the tension in a part of the magnetic tape disposed upstream from said heads constant within certain limits; and in particular to such a drive for an apparatus whose heads contact the tape along a tension-controlled loop.

The use of a closed or tension-controlled loop in magnetic tape drive arrangements serves mainly to obtain an accurately defined speed of the magnetic tape, at the location where the tape cooperates with the magnetic heads. In a known apparatus utilizing a tension-controlled loop formed with a single capstan (U.S. Pat. No. 2,948,488) the magnetic tape is passed from the supply reel to a fixed tape guide roller amounted on the deck of the apparatus, towards a subsequent tape guide roller which is mounted on a lever which is pivotable about its end. The position of this lever is variable, so that fluctuations in the transport speed of the magnetic tape can be taken up in such a way that the tension of the magnetic tape can remain constant. Directly before the take-up reel the magnetic tape is guided in a similar way. The tension in the magnetic tape immediately upstream and immediately downstream from the closed loop is determined by the drive of the capstan, the supply reel and the take-up reel. The objective is to maintain the tension in the magnetic tape in the closed loop as constant as possible and to isolate it as far as possible from tape-tension fluctuations outside the closed loop. It is important to apply such steps that it is ensured that the tape tension always has a positive value anywhere in the closed loop, because otherwise undesired loops may be formed locally in the closed loop.

Tests have revealed that in tension-controlled-loop magnetic tape drive arrangements the tape tension in the loop directly upstream from the capstan, that is at one end of the loop, is directly proportional to the tape tension directly outside the loop at the other end. As the magnetic tape in the loop runs over a number of surfaces, so that frictional forces are exerted on the magnetic tape, there is a risk that the tape tension in the tension-controlled loop directly downstream from the capstan becomes too low and looping occurs.

Therefore, it is essential to give the tape tension before the loop such a constant value that looping of the magnetic tape in the loop is prevented at all times. Furthermore, it is of importance that the tape tensions are minimal. In view of these two factors it will be evident that the tape tension in the loop is to be kept both as low and as constant as possible. Only slight variations of the tape tension in the loop are permissible. In practice it is found that the coefficients of friction of the various elements which cooperate with the magnetic tape in the loop, such as the magnetic heads and the said tape guide member, are variable under the influence of the ambient temperature and the ambient humidity. If looping of the magnetic tape is to be prevented at all times, the tape tension should be optimized so that it still suffices under the most unfavourable conditions.

SUMMARY OF THE INVENTION

It is an object of the invention to provide a tension-controlled-loop magnetic tape drive arrangement of the type mentioned in the preamble, in which the tape tension in the part of the magnetic tape upstream from the loop is automatically compensated for variations in ambient conditions such as the ambient temperature and humidity, so that a tape tension is obtained which is always adapted to the conditions which prevail.

In an apparatus according to the invention the drive means includes compensating means for compensation of variations of the tension in the magnetic tape in the loop as a result of variations in the coefficients of friction of the surfaces of the magnetic heads, the tape guide member, and any other elements which frictionally cooperate with the magnetic tape in the loop, caused by variation of the ambient temperature and humidity, the compensation means comprising a compensation element which is disposed upstream from the loop, which element frictionally cooperates with the magnetic tape by means of a friction surface which has an effective coefficient of friction $\mu_p$ which satisfies the relationship $$\mu_p = \frac{\sum_{k=1}^{k=n} \mu_k \theta_k}{\theta_p} \qquad (R1)$$

where $\mu_k$ = the effective coefficient of friction of a component which frictionally cooperates with the magnetic tape in the loop, such as a magnetic head or the tape guide member, $\theta_k$ = the angle of contact in radians over which the magnetic tape frictionally cooperates with the relevant component, $\theta_p$ = the angle of contact in radians, over which the magnetic tape frictionally cooperates with the compensation member, and n = the number of components with which the magnetic tape in the loop frictionally cooperates.

An effective coefficient of friction of a component which frictionally cooperates with the magnetic tape is to be understood to mean the quotient of the total frictional force exerted on the magnetic tape by the component and the total normal force acting between the component and the magnetic tape. An angle of contact over which the magnetic tape cooperates with a component is to be understood to mean the angle between the two radii which in a cross-section through the component and the magnetic tape connect the points where the magnetic tape just contacts the component and where the magnetic tape just leaves the component to the center of an imaginary circle on which the surface which frictionally cooperates with the magnetic tape is substantially disposed.

The effect of the invention will be explained scientifically in the description with reference to the drawing. The advantage of the invention is that the tape tension upstream from the tension-controlled loop is automatically changed as the tape tension in the loop is subjected to variations as a result of changes in the ambient temperature and humidity, in a very simple manner without the use of means other than a tape guide member which is stationarily arranged on the deck, which member has a very specific effective coefficient of friction.

In a preferred embodiment of the invention is characterized in that the compensation member comprises a stack of a plurality of discs, which are each manufactured from a material which is also employed in the said surfaces which frictionally cooperate with the magnetic tape in the loop. The advantage of this embodiment is that the correct effective coefficient of friction of the compensation member can be obtained in an easy manner, without the need of searching for materials having special properties, adaptation of the effective coefficient of friction being obtainable simply by varying the thicknesses of the discs relative to each other. In this respect according to a further preferred embodiment the compensation member consists of a cylindrical guide pin for the magnetic tape, which pin is stationarily mounted on the frame of the drive means.

Since it is essential in order to prevent warping of the magnetic tape, that the magnetic tape is symmetrically loaded by the frictional forces exerted on it, preferable such a stack of discs is used that relative to the center of the stack the discs are stacked symmetrically in respect of their dimensions and in respect of material.

BRIEF DESCRIPTION OF THE DRAWINGS

The invention will now be described in more detail with reference to the drawing, in which.

DESCRIPTION OF THE PREFERRED EMBODIMENT

Figure 1:
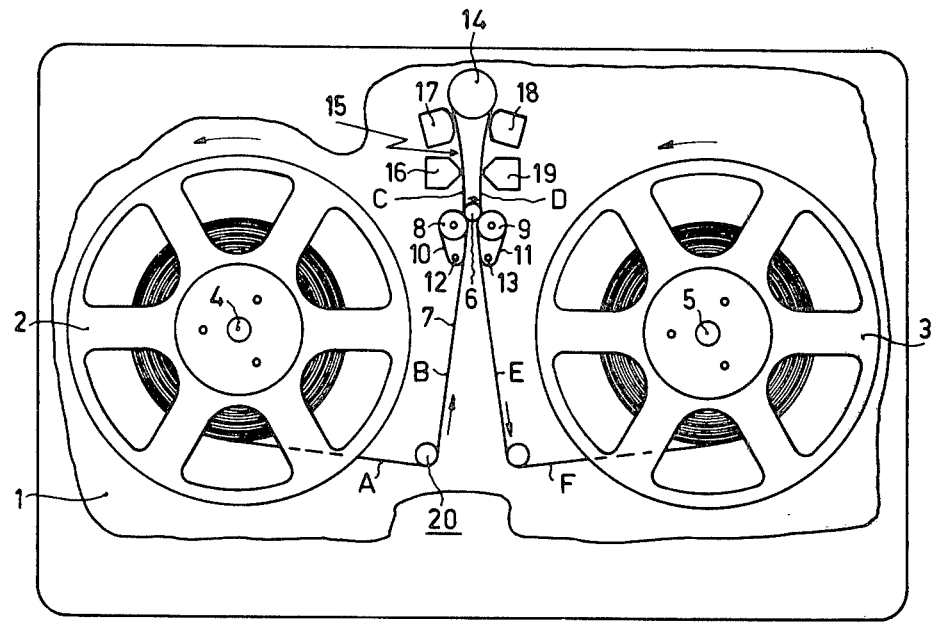
FIG. 1 shows a plan view of a schematically shown magnetic tape apparatus employing a closed tension-controlled loop.

In FIG. 1 a magnetic tape apparatus is shown schematically with only such detail as is deemed necessary for a correct understanding of the present invention. Magnetic tape apparatus employing a closed loop drive means are commonly known and used, see for example the U.S. Pat. No. 2,948,488. On the deck 1 of the magnetic tape apparatus two reels 2 and 3 are disposed, which function as the supply reel and the take-up reel respectively. Each of these reels contains an amount of magnetic tape 7. Between the two reels a part of the magnetic tape extends, having its various portions designated by the letters A through G in the figure. The supply reel 2 is fitted on a reel spindle 4 and the take-up reel 3 on a reel spindle 5. These two reel spindles are coupled to an electric drive means in the interior of the magnetic tape apparatus in any known manner, which drive means produces a tensile force of a specific magnitude in the portions A and F of the magnetic tape 7. For the sake of simplicity it is assumed that the reel spindles 4 and 5 are driven in such a way that the said tensile force in the portions A and F always have a perfectly constant value.

On the deck a capstan 6 is mounted which serves for driving the magnetic tape with an accurately defined speed on its way from the supply reel 2 to the take-up reel 3. The capstan is driven with a very accurate constant speed of rotation by an electrical motor, not shown. On either side of the capstan there are disposed two pressure rollers 8 and 9 which are rotatably mounted on two levers 10 and 11. These levers can perform pivotal movements about the spindles 12 and 13 and are shown in a position in which the two pressure rollers 8 and 9 press the magnetic tape against the capstan 6 at substantially opposite locations.

A tape guide member 14 which is mounted on the deck diverts the magnetic tape coming from the capstan 6, so that the magnetic tape is returned to the capstan. Thus, a closed loop 15 is formed in the magnetic tape. Four magnetic heads 16 through 19 cooperate with the magnetic tape in the loop 14. They serve for recording, playback and erasure of signals on the magnetic tape.

Upstream from the loop 15 there is located a compensation means for the compensation of variations of the tension in the loop of magnetic tape owing to variations in the coefficient of friction of the surfaces of the magnetic heads 16 through 19 and the tape guide member 14 which frictionally cooperate with the magnetic tape, as a result of variations in the ambient temperature and humidity. The compensation means is constituted by a stationary compensation pin 20, which is disposed directly upstream from the loop 15 and which is fixed to the deck 1 and frictionally engages the magnetic tape 7 along a cylindrical outer surface, which surface has an effective coefficient of friction $\mu_c$ which satisfies the previously given relationship (R1). The significance of the choice of the coefficient of friction $\mu_c$ in accordance with the relationship (R1) will be explained hereinafter.

Tests have received that the following is valid for a closed-loop drive arrangement in accordance with FIG. 1:

$$T_d = \alpha \cdot T_b \tag{R2}$$

where:

$T_d$ = tension in the magnetic tape 7 in portion D in N/m$^2$ $T_b$ = tension in the magnetic tape 7 in the portion B in N/m$^2$, and $\alpha$ = a constant with a value of approximately 1 to 1.5.

In practice this is utilized by adjusting the tension of the magnetic tape in the closed loop by maintaining the tension $T_a$ [N/m$^2$] in the portion A of the magnetic tape 7 constant.

According to a known relationship from mechanics:

$$T_c = T_d \exp. - \sum_{k=1}^{k=n} \mu_k \theta_k \tag{R3}$$

where:

$T_c$ = tension in the magnetic tape 7 in the portion C in N/m$^2$ $\mu_k$, $\theta_k$, n: see under relationship (R1) and furthermore:

$$T_b = T_a \exp. \ \mu_p \theta_p \tag{R4}$$

where: $\mu_p$, $\theta_p$: see relationship (R1).

From (R2) through (R4) it follows that:

$$T_c = \alpha T_a \exp. (\mu_p \theta_p - \Sigma \mu_k \theta_k) \tag{R5}$$

If the material of the magnetic heads 16 through 19 in the loop 15 is the same for all heads, then:

$$\mu_k = \mu_1, \text{ for all } k \tag{R6}$$

In this case it is logical to select for the compensation means 20 the same material that has already been used for the magnetic heads, so that $$\mu = \mu_k = \mu_1 \quad (R7)$$

From (R5) and (R7) it follows for this case that:

$$T_c = \alpha T_a \exp\{\mu_1(\theta_p - \Sigma\theta_k)\} \quad (R8)$$

It can now be seen immediately that the choice $$\theta_p = \Sigma\theta_k \quad (R9)$$

results in $$T_c = \alpha T_a \quad (R10)$$

independently of the value of $\mu_1$.

In the case of variations of $\mu_1$ the choice of $\theta_p$ given in (R9) ensures a constant $T_c$, provided that the tape tension $T_a$ is also maintained constant (for example by a method such as described in German Patent Specification DT-PS 837174 or in German Patent Specification DT-PS 1123124).

A different situation occurs if the coefficients of friction of the magnetic heads are not equal to each other and, moreover, change in a different manner as a function of the temperature and/or humidity. However in that case it is still possible to obtain a substantial reduction in the normally occurring change of $T_c$, if the first derivative of $T_c$ is made to equal zero by a suitable choice of $\mu_p \theta_p$.

It is assumed that this case relates to temperature compensation and that the temperature is given by $$t = t_o + \Delta t. \quad (R11)$$

where
$t_o$: nominal operating temperature in ° K.,
t: the instantaneous temperature in ° K., and
$\Delta t$: the deviation of the instantaneous temperature t from the nominal temperature $t_o$.

For the differential of $T_d$ it then follows that $$dT_c = \frac{\partial T_c}{\partial \mu_p} \cdot \frac{d\mu_p}{dt} \Delta t + \Delta t \Sigma \frac{\partial T_c}{\partial \mu_k} \cdot \frac{\partial \mu_k}{\partial t} \quad (R12)$$

The derivatives in (R12) should be taken in the operating point $t = t_o$. With the aid of the relationship (R5) differentiation yields:

$$\frac{\partial T_c}{\partial \mu_p} = \theta_p T_c \quad (R13)$$

$$\frac{\partial T_c}{\partial \mu_k} = -\theta_k T_c \quad (R14)$$

and in accordance with (R12) through (R14), the following results:

$$\frac{dT_c}{T_c} = (\theta_p \frac{d\mu_p}{dt} - \Sigma \theta_k \frac{d\mu_k}{dt}) \quad (R15)$$

From this equation it follows that $T_d$ can be stabilized against temperature variations of $\mu_p$ and $\mu_k$ (at least in a first approximation), if the expression in brackets is made to equal zero. This means that $\mu_p$ is to be selected so that the following relationship is satisfied $$\theta_p = \frac{\Sigma \theta_k \frac{d\mu_k}{dt}}{\frac{d\mu_p}{dt}} \quad (R16)$$

where the derivatives $(d\mu_k/dt)$ and $(d\mu_p/dt)$ are valid in the operating point $t = t_o$. For small variations of t in the proximity of $t = t_o$, $T_c$ is then constant.

If $\mu_k$ and $\mu_p$ are temperature dependent in a similar way, or rather if $\mu_k(t)$ and $\mu_p(t)$ are identical functions of t, the derivatives are also equal:

$$(d\mu_p/dt) = (d\mu_k/dt) \quad (R17)$$

Substitution of (R17) in (R16) again yields the previously given relationship (R9)

$$\theta_p = \Sigma\theta_k \quad (R9)$$

A composite compensation means may also be considered, where $\mu_p \theta_p$ is such that the relationship $$\mu_p \theta_p = \Sigma \mu_k \theta_k \quad (R18)$$

is also automatically satisfied for mutually different functions $\mu_k(t)$.

This can be achieved by assembling the cylindrical compensation means 20 from discs of the same material (or materials) from which the head faces of the magnetic heads 16 through 19 are constructed. By selecting the thickness of the discs proportional to the respective values of the products $\mu_k \theta_k$, an average $\overline{\overline{\mu_p}}$ measured over the entire contact surface of the compensation means is obtained, which satisfies:

$$\mu_p \propto \Sigma \mu_k \theta_k \quad (R19)$$

This $\overline{\overline{\mu_p}}$ is not only proportional to $\Sigma \mu_k \theta_k$, but also varies in the same way with the temperature. The angle of contact $\theta_p$ can then be selected in such a way that the proportionality (R19) changes into equality:

$$\overline{\overline{\mu_p}} \theta_p = \Sigma \mu_k \theta_k \quad (R20)$$

so that $T_c$ is then fully stabilized aginst temperature variations, even if the materials of the friction surfaces of the magnetic heads have a mutually different value $\mu_k$ and exhibit a mutually different temperature dependence.

Figure 2:
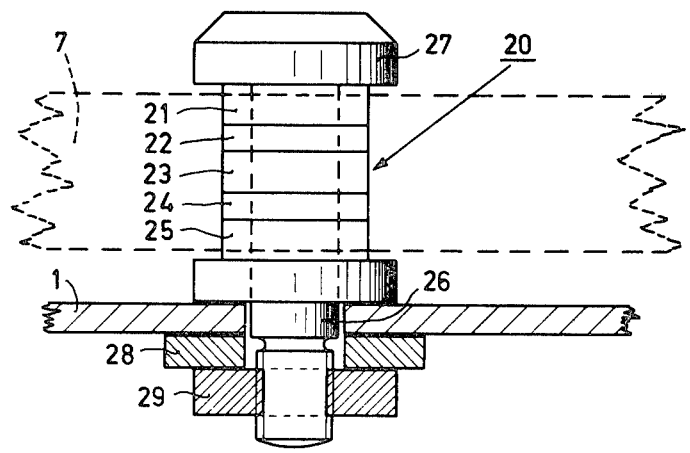
FIG. 2 is a detail view which shows an example of a compensation member for a drive means in accordance with the invention.

FIG. 2 shows a compensation means 20 which consists of a stack of a plurality of discs 21 through 25, which are each manufactured from a material which is also used in the surfaces of the magnetic heads 16 through 19 that frictionally engage the magnetic tape in the loop. These discs are mounted on a shank 6 of a bolt 7 which is passed through the frame 1 of the magnetic tape apparatus and which is secured thereto with the aid of a washer 28 and a nut 29. The stack of discs is symmetrical, the discs 22 and 24 being equally thick and consisting of the same material. Thus, they exert equal frictional forces on the magnetic tape. The discs 21 and 25 are also equally thick and made of the same material. The magnetic tape is thus symmetrically loaded by the frictional forces and has no tendency to warp.

What is claimed is:

1. A closed loop magnetic tape drive arrangement, comprising:
a frame (1),
a supply reel (2) for paying out a length of magnetic tape wound on it, a take-up reel (3) for taking up the length of magnetic tape paid out by the supply reel, a drive means for the supply reel, a drive means for the take-up reel, a capstan (8) for driving the magnetic tape (7) with an accurately defined speed, tape deck components including a first and a second pressure roller (8, 9) for pressing the magnetic tape against the capstan (6) at substantially opposite locations, a tape guide member (14) around which the magnetic tape coming from the capstan (6) is passed so as to be returned to the capstan, so that a loop (15), which is under tension, is formed in the magnetic tape, a plurality of magnetic heads (16 - 19) for cooperation with the magnetic tape in the loop, and a control device for maintaining the tension in a part of the magnetic tape (7) upstream from said loop (15) in the magnetic tape constant within certain limits, characterized in that the drive means includes compensation means for the compensation of variations of the tension in the magnetic tape (7) in the loop (15) as a result of variations in the coefficients of friction of the surfaces of the magnetic heads (16-19), the tape guide member (14) and other components which frictionally cooperate with the magnetic tape in the loop in the case of a variation of the ambient temperature and humidity, the compensation means comprising a compensation element (20) which is disposed upstream from the loop, which element frictionally cooperates with the magnetic tape by means of a friction surface which has an effective coefficient of friction $\mu_p$ which satisfies the relationship $$\mu_p = \frac{\sum_{k=1}^{k=n} \mu_k \theta_k}{\theta_p}$$

where:

$\mu_k$ = the effective coefficient of friction of a component which frictionally cooperates with the magnetic tape in the loop, such as a magnetic head or the tape guide member, $\theta_k$ = the angle of contact in radians over which the magnetic tape frictionally cooperates with the relevant component, $\theta_p$ = the angle of contact in radians, over which the magnetic tape frictionally cooperates with the compensation member, and n = the number of components with which the magnetic tape in the loop frictionally cooperates.

2. A closed loop magnetic tape drive arrangement as claimed in claim 1, characterized in that the compensation member (20) comprises a stack of a plurality of discs (21-25), which are each manufactured from a material which is also used in the said surfaces which frictionally engage the magnetic tape (7) in the loop (15).

3. A closed loop magnetic tape drive arrangement as claimed in claim 1 or 2 characterized in that the compensation means (20) consist of a cylindrical guide pin for the magnetic tape, which pin is stationarily mounted on the frame (1) of the drive arrangement.

4. A closed loop magnetic tape drive arrangement as claimed in claim 2, characterized in that the discs are stacked symmetrically to the center of the stack in respect of their dimensions and in respect of their material.

5. A tape drive arrangement comprising means for guiding a length of tape along a path, said tape guiding means including at least one tape guide member around which the tape is passed, a capstan for driving the tape with an accurately defined speed, a head element disposed for operative contact with the tape, and a control device for maintaining tension in a part of the tape along said path constant within certain limits, wherein the means for guiding includes means for compensating variations of tension of the tape, which variations are a result of variation in the coefficients of friction between the tape and a number of components which the tape frictionally engages, said components including at least said head and said guide member, said means for compensating comprising a compensation element which frictionally engages the tape with a friction surface having an effective coefficient of friction $\mu_p$ which satisfies the relationship $$\mu_p = \frac{\sum_{k=1}^{k=n} \mu_k \theta_k}{\theta_p}$$

in which $\mu_k$ is the effective coefficient of friction of a component which frictionally engages the tape, $\theta_k$ is the angle of contact in radians over which the tape frictionally engages the respective components, $\theta_p$ is the angle of contact in radians over which the tape frictionally engages the respective member, and n is the number of components with which the tape frictionally engages.

6. An arrangement as claimed in claim 5 wherein said compensation element comprises a plurality of discs arranged as a stack of discs, respective discs having a surface comprising a material having an effective coefficient of friction equal to that of a respective one of said components which frictionally engage the tape.

7. An arrangement as claimed in claim 6 wherein said stack of discs is a cylindrical guide pin for the magnetic tape, the discs being stacked symmetrically relative to the center of the stack in respect of dimensions and material composition of the discs.

* * * * *